United States Patent
Wang et al.

(10) Patent No.: US 9,302,910 B2
(45) Date of Patent: Apr. 5, 2016

(54) SHORT-FLOW PROCESS FOR DESULFURIZATION OF CIRCULATING HYDROGEN AND DEVICE FOR THE SAME

(75) Inventors: Hualin Wang, Shanghai (CN); Ji Ma, Shanghai (CN); Zhuoqun Qian, Shanghai (CN); Yanhong Zhang, Shanghai (CN); Liquan Li, Henan (CN); Qian Zeng, Henan (CN); Chonggang Chen, Henan (CN); Qiang Yang, Shanghai (CN); Xiaomei Xu, Shanghai (CN); Xin Cui, Shanghai (CN)

(73) Assignees: SHANGHAI HUACHANG ENVIRONMENT PROTECTION CO., LTD., Luoyang (CN); LUOYANG PETROCHEMICAL ENGINEERING CORPORATION (LPEC)/SINOPEC, Luoyang (CN)

( * ) Notice: Subject to any disclaimer, the term of this patent is extended or adjusted under 35 U.S.C. 154(b) by 601 days.

(21) Appl. No.: 12/557,320

(22) Filed: Sep. 10, 2009

(65) Prior Publication Data

US 2010/0104498 A1    Apr. 29, 2010

Related U.S. Application Data

(63) Continuation of application No. PCT/CN2008/073594, filed on Dec. 19, 2008.

(30) Foreign Application Priority Data

Oct. 24, 2008    (CN) .......................... 2008 1 0201686

(51) Int. Cl.
*B01D 19/00*    (2006.01)
*C01B 3/50*    (2006.01)
(Continued)

(52) U.S. Cl.
CPC ................. *C01B 3/50* (2013.01); *B01D 53/485* (2013.01); *B01D 53/52* (2013.01); *C01B 3/52* (2013.01);
(Continued)

(58) Field of Classification Search
CPC ......... B01D 53/485; B01D 53/52; C01B 3/52
USPC ......................................................... 96/188
See application file for complete search history.

(56) References Cited

U.S. PATENT DOCUMENTS 5,948,378 A * 9/1999 Koveal et al. ................. 423/236
5,972,202 A * 10/1999 Benham et al. ............... 208/107
(Continued)

FOREIGN PATENT DOCUMENTS

CN        1180657        5/1998
CN        2912804        6/2007
(Continued)

OTHER PUBLICATIONS

International Search Report of PCT/CN2008/073594, dated Aug. 6, 2009, and English language translation thereof, 4 pages total.

*Primary Examiner* — Paul Wartalowicz
(74) *Attorney, Agent, or Firm* — Hamre, Schumann, Mueller & Larson, P.C.

(57) ABSTRACT

The invention relates to a short-flow process for desulfurization of circulating hydrogen and a device for the same. A short-flow process for desulfurization of circulating hydrogen is provided, comprising: (a) removing hydrocarbons from the circulating hydrogen mixture, so that the liquid drops of the heavy hydrocarbons in the dispersion phase are separated from the circulating hydrogen in the continuous phase, and a heavy hydrocarbon phase and a mixture phase of circulating hydrogen containing sulfur are obtained; (b) further separating the resultant mixture phase to remove the sulfides therein, so that circulating hydrogen without sulfur is obtained; (c) further separating the resultant circulating hydrogen without sulfur to remove the amine solution therein, so that purified circulating hydrogen is obtained. The invention also provides a device for desulfurization of circulating hydrogen.

8 Claims, 2 Drawing Sheets

(51) Int. Cl.
*B01D 53/48* (2006.01)
*B01D 53/52* (2006.01)
*C01B 3/52* (2006.01)

(52) U.S. Cl.
CPC ....... *B01D 2256/16* (2013.01); *B01D 2257/304* (2013.01); *C01B 2203/0415* (2013.01); *C01B 2203/0465* (2013.01); *C01B 2203/0485* (2013.01); *C01B 2203/0495* (2013.01)

(56) References Cited

U.S. PATENT DOCUMENTS

| | | | | |
|---|---|---|---|---|
| 5,994,147 | A | * | 11/1999 | Rodriguez et al. ............ 436/163 |
| 2001/0046460 | A1 | * | 11/2001 | Zhurin et al. ................. 422/188 |
| 2003/0057136 | A1 | * | 3/2003 | McIntush et al. ............. 208/209 |
| 2004/0065110 | A1 | * | 4/2004 | Barratt et al. ................... 62/471 |
| 2004/0079227 | A1 | * | 4/2004 | Lim et al. ........................... 95/90 |
| 2007/0237695 | A1 | | 10/2007 | Hu |
| 2008/0025880 | A1 | * | 1/2008 | Shurtleff et al. ............... 422/112 |

FOREIGN PATENT DOCUMENTS

| | | |
|---|---|---|
| CN | 101062460 | 10/2007 |
| CN | 200995173 | 12/2007 |
| CN | 101274196 | 10/2008 |
| CN | 101294104 | 10/2008 |

* cited by examiner

SHORT-FLOW PROCESS FOR DESULFURIZATION OF CIRCULATING HYDROGEN AND DEVICE FOR THE SAME

CROSS REFERENCE TO RELATED APPLICATIONS

This application is a continuation of International Patent Application No. PCT/CN2008/073594, filed on Dec. 19, 2008, which claims priority to Chinese Application No. 200810201686.5, filed on Oct. 24, 2008, the entire contents of both of which are incorporated herein by reference.

TECHNICAL FIELD

The invention relates to the field of exhaust gas treatment, particularly to a process for removing sulfides from a circulating hydrogen mixture. More specifically, the invention relates to a short-flow process for purifying a circulating hydrogen mixture containing sulfur during hydrogenation and a device for the same.

BACKGROUND

In recent years, crude oil containing sulfur imported by China has been growing year by year, and that imported in 2002 reached $6.9 \times 10^7$ tons. Due to the high content of sulfur in the crude oil produced by Arabian countries in Middle East, the proportion of imported crude oil containing sulfur to be processed has been increased year after year. The increase of sulfur in the circulating hydrogen of a hydrogenation process, depending on the increase of sulfur in crude oil, leads to the growth of the density of the circulating hydrogen and the energy consumed by the circulating hydrogen compressor, and the decrease of the purity of the hydrogen gas as well as the useful life and the activity of the catalyst.

The existing hydrogenation devices typically has the problem that circulating hydrogen, liquid hydrocarbons, diesel oil, waste water containing sulfur and low-pressure separator gas tend to entrap such dispersion-phase particles as heavy hydrocarbons, amine, water, catalyst and the like, which not only results in the increase of the consumption of additives and the loss of starting materials, but also results in serious damage to the down-stream key equipments in terms of long cycle run. The entrapment of heavy hydrocarbons in circulating hydrogen, liquid hydrocarbons and low-pressure separator gas may cause the circulating hydrogen, the liquid hydrocarbons and the solvent in the desulfurizer for the low-pressure separator gas to froth and cause the abnormal loss of amine solution. The amount of amine solution lost varies significantly from a minimum of 0.05 kg/ton dry gas or 0.1 kg/ton liquefied petroleum gas to a maximum of 1.0 kg/ton dry gas or 10 kg/ton liquefied petroleum gas, depending on the specific manufacturing device. The abnormal loss of amine solution may aggravate the burden of the waste water disposing plant directly by inflicting secondary contamination on the waste oil system. Furthermore, the solution and the dust entrapped in the circulating hydrogen constitute a great threat to the long cycle run of the compressor. The problem currently existing in nearly all refiners to various extents is that circulating hydrogen, liquid hydrocarbons, diesel oil, waste water containing sulfur and low-pressure separator gas entrap solution and dust, which may boil down to non-homogeneous separation, and is in an urgent need to be attacked in design and operation.

In prior processes, a coalescer has been chosen to remove the solution and the dust entrapped in circulating hydrogen, liquid hydrocarbons, diesel oil, waste water containing sulfur and low-pressure separator gas. However, the long cycle run time of only one year presently guaranteed by coalescer providers around the world in the form of technical agreements cannot meet the demand of SINOPEC who expects the maintenance to be done every three years. If the guaranteed long cycle run time is three years, the diameter of the coalescer must be increased to that of the reactor. This means higher cost and more occupation of ground. Additionally, the coalescer must be equipped with a bypass system, thus disagreeing with the general design criteria for high-pressure systems. As revealed by an investigation, the heavy hydrocarbons coalescer for circulating hydrogen in Maoming Branch of SINOPEC can only run for one year before maintenance rather than three years as demanded by long cycle run.

With respect to the entrapment of amine solution in circulating hydrogen, liquid hydrocarbons and low-pressure separator gas at the outlet of the desulfurizer, a sedimentation tank is generally designed to remove the solution and the dust. However, desulfurization with amine suffers from a troublesome problem yet to be solved thoroughly, i.e. so called "solvent frothing-up" or the quick loss of amine solution. Amine solution is prone to froth per se, and in the cases where the contents of heavy hydrocarbons such as C5, impurities such as HSS and iron rust (e.g. due to incomplete pre-treatment of the system by scrubbing with alkaline solution before the newly-built equipment is put into operation) in the system are high, frothing will be initiated. Though a defrother may be used to temporarily refrain the amine solution froth induced by such frothers from growing further, froth plugging that is a blank wall will come into being if the froth develops to certain extent, and thus the compressor will not run properly.

Therefore, future effort is undoubtedly directed toward the development of a non-homogeneous particle separating system which can be used to treat circulating hydrogen, liquid hydrocarbons, diesel oil, waste water containing sulfur and low-pressure separator gas from a hydrocracking device with high efficiency, safety, environmental compatibility and long operating cycle.

Microcyclone separators of 5 mm, 10 mm, 15 mm and 25 mm were designed by School of Mechanical and Materials Engineering of Washington State University in USA. A cyclone separator of 19 mm might achieve a separation efficiency of 95% for 3 μm bio-aerosol particles, and over 80% for 2 μm bio-aerosol particles. However, this technology, still in its experimental study phase, faces a lot of difficulties to be overcome before it is applied to industry.

Among the considerable efforts made by Chinese researchers in vortex separation industry, Chinese patent CN 200995173Y disclosed a gas-liquid vortex separator, and CN 2912804Y published a multi-column-cone vortex separator for liquid-liquid separation, the main body of which was composed of several column sections and cone sections, which were connected alternatively, with a tail pipe attached thereto. Although the application scope of vortex separation technologies has been under continuous expansion due to the innovation in the configurations of vortex separation devices, vortex separation processes are still subjected to technological limitation when the density difference is small and the separation precision is required to be high.

Anyway, due to the foregoing problems in the prior art, no way has been found so far to purify a circulating hydrogen mixture containing sulfur to a satisfactory extent, and thus the expectation of clean production in the petrochemical engineering sector is far from being satisfied. Therefore, there is an urgent need in the art for a process for treating a circulating hydrogen mixture containing sulfur at low cost and with good effect, and a device for the same.

SUMMARY

The invention provides a novel short-flow process for desulfurization of circulating hydrogen and a device for the same, which has overcome the shortcomings of the prior art.

According to one aspect, the invention provides a short-flow process for desulfurization of circulating hydrogen, comprising:

(a) removing hydrocarbons from the circulating hydrogen mixture, so that the liquid drops of the heavy hydrocarbons in the dispersion phase are separated from the circulating hydrogen in the continuous phase, and a heavy hydrocarbon phase and a mixture phase of circulating hydrogen containing sulfur are obtained;

(b) further separating the resultant mixture phase to remove the sulfides therein, so that circulating hydrogen without sulfur is obtained; and (c) further separating the resultant circulating hydrogen without sulfur to remove the amine solution therein, so that purified circulating hydrogen is obtained.

In one preferred embodiment, the concentration of the sulfides in the mixture phase obtained in said step (a) is reduced to 10 ppm or less after it is desulfurized in step (b).

In another preferred embodiment, when the content of amine solution in the mixture phase obtained in said step (a) is no more than 4000 mg/Nm$^3$, the content of free amine in the purified circulating hydrogen obtained after removing amine solution in said step (c) is no more than 20 mg/Nm$^3$.

According to another aspect, the invention provides a short-flow device for desulfurization of circulating hydrogen, comprising:

a de-hydrocarbon unit for removing hydrocarbons from the circulating hydrogen mixture, so that the liquid drops of the heavy hydrocarbons in the dispersion phase are separated from the circulating hydrogen in the continuous phase, and a heavy hydrocarbon phase and a mixture phase of circulating hydrogen containing sulfur are obtained; a desulfurizer, connected with the gas phase outlet of said de-hydrocarbon unit, for further separating the resultant mixture phase to remove the sulfides therein, so that circulating hydrogen without sulfur is obtained; and a de-amine unit, disposed in said desulfurizer, for further separating the resultant circulating hydrogen without sulfur to remove the amine solution therein, so that purified circulating hydrogen is obtained.

In one preferred embodiment, said de-amine unit is selected from a sedimentation tank, a coalescer and a hydrocyclone.

In another preferred embodiment, for said de-amine unit used to recover amine solution, the cut particle size is up to 5 μm, the recovery is more than 90% for liquid drops larger than 10 μm, and the isolating time is 1-3 seconds.

In another preferred embodiment, when the hydrocarbon components in said de-hydrocarbon unit are C5 and higher hydrocarbons, the calculated separation precision for the liquid drops is 3 μm, and the removal rate for the liquid drops larger than 5 μm is over 95%; the separation precision for the liquid drops of liquid hydrocarbons, diesel oil and waster water containing sulfur is 15 μm, and the removal rate for the liquid drops larger than 25 μm is over 95%; and the pressure drop of said de-hydrocarbon unit is less than 0.15 MPa.

In another preferred embodiment, when the content of the heavy hydrocarbons at the inlet of said de-hydrocarbon unit is no more than 1350 mg/m$^3$, there is trace amount of heavy hydrocarbons at the outlet of the underflow port.

In another preferred embodiment, the device further comprises a wire mesh demiste, disposed in front of said de-amine unit, for removing preliminarily part of the liquid drops and solid particles from the gas mixture which enters the vortex separator located within the top part of said desulfurizer.

In another preferred embodiment, the rich amine solution in said desulfurizer is discharged from the solution accumulation chamber at its bottom to an amine solution regeneration column for regeneration, and the lean amine solution from the generation column is mixed into the makeup amine solution and then pumped into the desulfurizer for recycling, which reduces the consumption of amine by 60%.

DETAILED DESCRIPTION OF THE INVENTION

Figure 1:
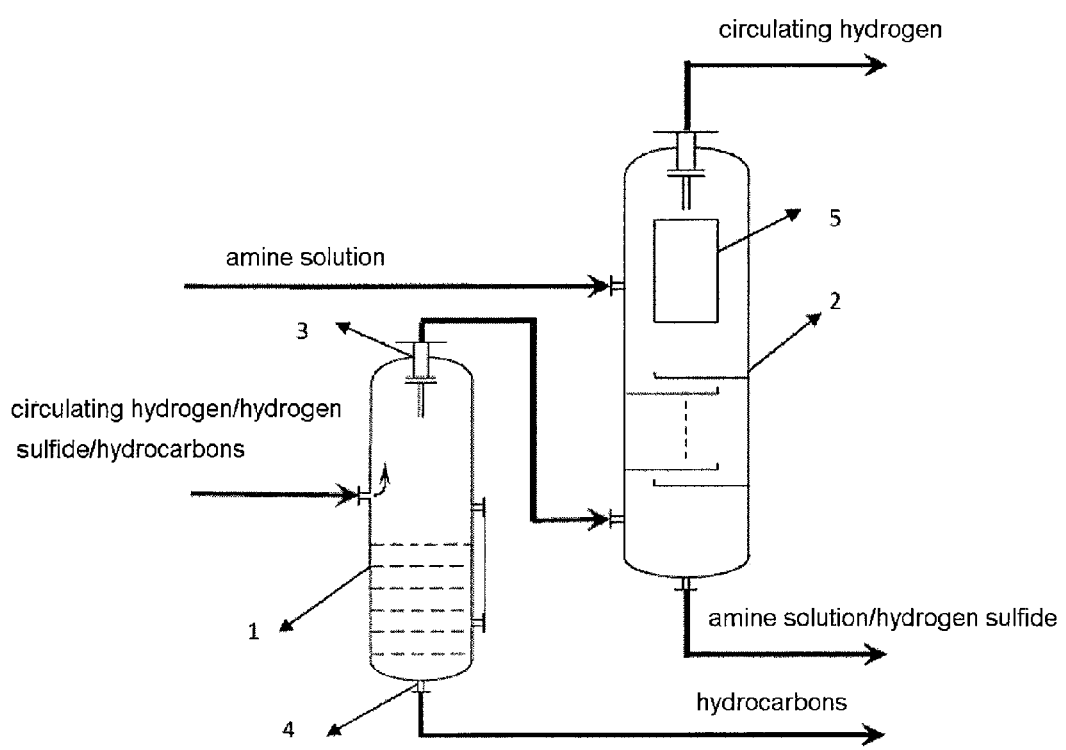
FIG. 1 is a schematic view showing a short-flow process for desulfurization of circulating hydrogen in accordance with one embodiment of the invention.

After extensive and intensive study, the present inventors have found that when an effective combination of a de-hydrocarbon unit, a desulfurizer and a de-amine unit disposed in the desulfurizer is used to treat circulating hydrogen through desulfurization, a short-flow device for desulfurization of circulating hydrogen can be obtained with lower investment in equipments, less occupation of ground, less failures of equipments, better effect in treating circulating hydrogen mixture and in solving the problems such as loss of amine solution and solvent frothing up, longer useful life and higher activity of the catalyst, and lower energy consumption. The invention is accomplished on the basis of the foregoing findings.

According to the invention, the sedimentation tank at the circulating hydrogen inlet of the desulfurizer is miniaturized, the gravity sedimentation tank at the circulating hydrogen outlet of the desulfurizer is omitted, and a separator is disposed within the low-pressure separation tank, in place of the vortex separator for circulating hydrogen at the inlet of the circulating hydrogen desulfurizer. Thus, a novel process with super short flow for desulfurization of circulating hydrogen is formed with no separating units positioned before the inlet and behind the outlet of the desulfurizer.

According to the first aspect of the invention, a process is provided for desulfurization of circulating hydrogen, comprising:

(a) allowing the circulating hydrogen mixture to pass through a de-hydrocarbon unit, so that the liquid drops of the heavy hydrocarbons in the dispersion phase are separated from the circulating hydrogen in the continuous phase, and a heavy hydrocarbon phase and a mixture phase of circulating hydrogen containing sulfur are obtained;

(b) further separating the resultant circulating hydrogen mixture to remove the sulfides therein, so that circulating hydrogen without sulfur is obtained; and (c) further separating the resultant gas phase to remove the amine solution therein, so that purified circulating hydrogen is obtained.

Preferably, when the content of the heavy hydrocarbons at the inlet of said circulating hydrogen de-hydrocarbon unit is no more than 1350 mg/m$^3$, there is trace amount of heavy hydrocarbons at the outlet of the underflow port.

Preferably, in step (a), the hydrocarbon components in said circulating hydrogen de-hydrocarbon unit are C5 and higher hydrocarbons, wherein the calculated separation precision for the liquid drops is and the removal rate for the liquid drops larger than 5 μm is over 95%; the separation precision for the liquid drops of liquid hydrocarbons, diesel oil and waster water containing sulfur is 15 μm, and the removal rate for the liquid drops larger than 25 μm is over 95%; and, the pressure drop of said de-hydrocarbon unit is less than 0.15 MPa.

Preferably, the concentration of the sulfides in the circulating hydrogen mixture obtained in said step (a) is reduced to 10 ppm or less after it is desulfurized by a desulfurizing absorbent in step (b).

Preferably, when the content of amine solution in the inlet gas mixture is no more than 4000 mg/Nm$^3$, the content of free amine in the purified gas after said step (c) is no more than 20 mg/Nm$^3$.

Preferably, in step (c), for said de-amine unit used to recover amine solution, the cut particle size is up to 5 μm, the recovery is more than 90% for liquid drops larger than 10 μm, and the isolating time is 1-3 seconds. The content of liquid drops at the overflow port of the vortex separator is no more than 20 mg/m$^3$.

According to the second aspect of the invention, a device is provided for the above process, comprising:

a de-hydrocarbon unit for separating heavy hydrocarbons, a desulfurizer connected with the gas phase outlet of said de-hydrocarbon unit for absorbing the sulfides therein, and a de-amine unit for separating the amine solution contained in the circulating hydrogen after the desulfurization process.

Preferably, said de-hydrocarbon unit is selected from one or more of a sedimentation tank, a coalescer and a hydrocyclone depending on the precision requirement of the treatment.

Preferably, said de-hydrocarbon unit is connected with the desulfurizer through its gas phase outlet, and the heavy hydrocarbons and waster water are discharged from the underflow port of the de-hydrocarbon unit.

Preferably, an amine separating unit, selected from any one of a sedimentation tank, a coalescer and a hydrocyclone, is added within the desulfurizer. The unit is used to preliminarily remove part of the liquid drops and solid particles from the gas mixture which enters the de-amine unit located within the top part of said desulfurizer, so as to promote the separation efficiency for the gas-liquid phases and prolong the service cycle of the gas-liquid vortex separator.

Preferably, the desulfurization system for circulating hydrogen of the invention takes effective control of the frothing of amine solution, avoiding the loss of excessive amine solution and reducing the consumption of amine by 60%.

Preferably, the desulfurization system for circulating hydrogen of the invention reduces the density of the circulating hydrogen via removing the heavy hydrocarbons and water therefrom, and thus reduces the energy consumption of the compressor by about 12%.

Preferably, the desulfurization system for circulating hydrogen of the invention promotes the purity of the circulating hydrogen by about 2.2%, corresponding to an increase of the hydrogen partial pressure by 2.2%. According to the result of the research conducted on Middle-East fraction oil using SSOT process, the life of the catalyst can be promoted by 8.6%.

Preferably, a wire mesh demiste is added before the de-amine unit in the desulfurizer, so as to preliminarily remove part of the liquid drops and solid particles from the gas mixture which enters the de-amine unit located within the top part of the vortex separator, so as to promote the separation efficiency for the gas-liquid phases and prolong the service cycle of the gas-liquid vortex separator.

Preferably, the rich amine solution in said desulfurizer is discharged from the solution accumulation chamber at its bottom to an amine solution regeneration column for regeneration, and the lean amine solution from the generation column is mixed into the makeup amine solution and then pumped into the desulfurizer for recycling, while the sulfides enter the subsequent processing device.

Reference is now made to the drawings.

FIG. 1 is a schematic view showing a short-flow process for desulfurization of circulating hydrogen in accordance with one embodiment of the invention. As shown in FIG. 1, a circulating hydrogen mixture containing circulating hydrogen, hydrogen sulfide and hydrocarbons is fed into a de-hydrocarbon unit 1 to remove the hydrocarbons, so that the liquid drops of the heavy hydrocarbons in the dispersion phase are separated from the circulating hydrogen in the continuous phase, and a heavy hydrocarbon phase and a mixture phase of circulating hydrogen containing sulfur are obtained; the mixture phase is allowed to enter a desulfurizer 2, in which a de-amine unit 5 is disposed, for further separation after it is discharged from the gas phase outlet 3 of the de-hydrocarbon unit 1, so that circulating hydrogen without sulfur is obtained; the resultant heavy hydrocarbons and waste water are discharged from the underflow port 4 of the desulfurizer 2; the resultant circulating hydrogen without sulfur is further separated by the de-amine unit 5, so that the amine solution therein is removed, and purified circulating hydrogen is obtained and discharged from the top of the desulfurizer 2; and, the amine solution and hydrogen sulfide removed are discharged from the bottom of the desulfurizer 2 and enter an amine solution regeneration column (not shown) for regeneration, and the lean amine solution from the generation column is mixed into the makeup amine solution and then pumped into the desulfurizer 2 for recycling.

Figure 2:
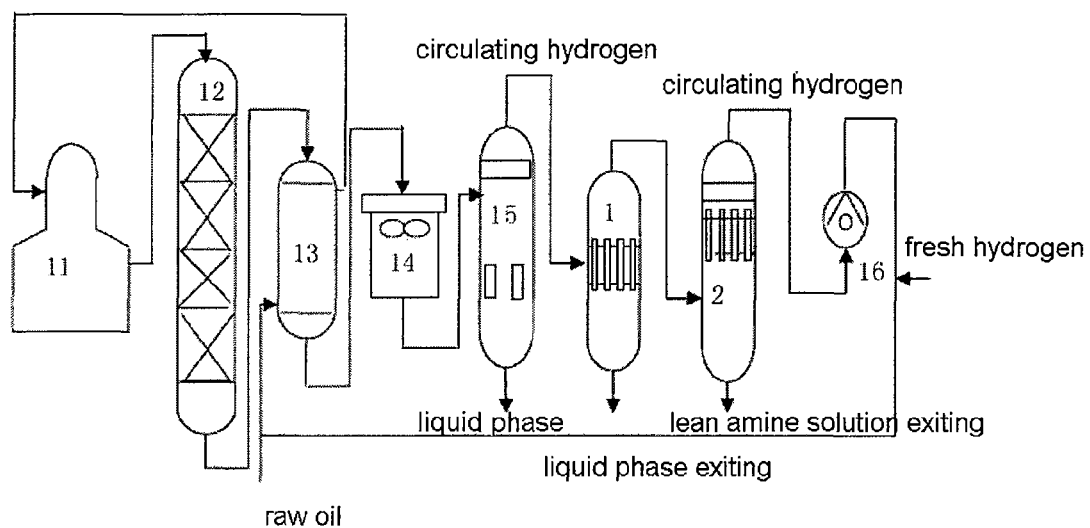
FIG. 2 is a schematic view showing a process for desulfurization of circulating hydrogen in hydrocracking, which comprises the short-flow process for desulfurization of circulating hydrogen in accordance with the invention.

FIG. 2 is a schematic view showing a process for desulfurization of circulating hydrogen in hydrocracking, which comprises the short-flow process for desulfurization of circulating hydrogen in accordance with the invention. As shown in FIG. 2, raw oil heated by a heating burner 11 is discharged from the upper port of a hydrogenation reactor 12 and then fed into the reactor in which refining reactions take place; the resultant high-temperature mixture containing sulfur is fed into a heat exchanger 13 from its upper port for preliminary cooling, after which it is fed into an air cooler 14 for further cooling; a circulating hydrogen mixture containing hydrogen sulfide and heavy hydrocarbons is separated from a formed oil via a high-pressure separator 15, wherein the formed oil is discharged from the bottom of the high-pressure separator 15 as a liquid phase, while the circulating hydrogen mixture is fed into a de-hydrocarbon unit 1 from the upper outlet of the high-pressure separator 15; the de-hydrocarbon unit 1 is used to remove the heavy hydrocarbon components entrapped in the circulating hydrogen mixture; the heavy hydrocarbon components separated are discharged from the lower outlet of the de-hydrocarbon unit 1 as a liquid phase, and the circulating hydrogen containing sulfur is discharged from the upper outlet of the de-hydrocarbon unit 1 and then fed into a desulfurizer 2 in which an amine solution is used as an absorbent to remove the sulfides from the circulating hydrogen; the resultant lean amine solution is discharged from the bottom of the desulfurizer 2, and the rich amine solution is fed into a de-amine unit to remove the amine; a circulating hydrogen compressor 16 is used to pump the purified circulating hydrogen into the heat exchanger 13 in which the gas is cooled; and, raw oil and fresh hydrogen can be fed directly into the heat exchanger 13 to be pre-heated by a large amount of heat carried out from the hydrogenation reactor 12 before they are fed into the heating burner 11.

The main advantages of the process and the device according to the invention include:

Lower investment in equipments, less occupation of ground, less failures of equipments, better effect in treating circulating hydrogen mixture and in solving the problems such as loss of amine solution and solvent frothing up, longer useful life and higher activity of the catalyst, and lower energy consumption are achieved in accordance with the invention.

EXAMPLES

The invention is to be illustrated in more details with reference to the following specific examples. However, it is to be appreciated that these examples are merely intended to exemplify the invention without limiting the scope of the invention in any way. In the following examples, if no conditions are denoted for any given testing process, either conventional conditions or conditions advised by manufacturers should be followed. All percentages and parts are based on weight unless otherwise indicated.

The Desulfurizing System for Circulating Hydrogen in the 1,500,000 tons/year Hydrocracking Device of Refining Division V of Zhenhai Refining & Chemical Company affiliated to SINOPEC:

1. Process Flow:

The specific process flow was shown in FIG. 2.

(1) Key Equipments:

The key equipments in the process flow included a de-hydrocarbon unit 1 and a desulfurizer 2, wherein the de-hydrocarbon unit had a diameter of 2400 mm, a height of 9995 mm and a processing capacity of 280000 $Nm^3/h$.

(2) Controlling Parameters:

The circulating hydrogen was fed into the de-hydrocarbon unit at a flow rate of 282000 $Nm^3/h$. The operating pressure was 13.5 MPa (gauge pressure), and the operating temperature was 50□.

(3) Operational Effect:

The circulating hydrogen de-hydrocarbon unit worked efficiently and stably with an average liquid-removal rate of 1350 $mg/m^3$ under working condition. As indicated by the gas chromatography analysis conducted at both the inlet and the outlet, the average content of C5 and higher hydrocarbons was reduced from 38.42 $g/Nm^3$ to 11.02 g/Nm, and the average content of water was reduced from 6.5 $g/Nm^3$ to 1.6 $g/Nm^3$. More notably, the buffer tank positioned behind the circulating hydrogen desulfurizer had never received any liquid since it was put into use, thus indicating that the circulating hydrogen entrapped substantially no liquid drop after it exited the desulfurizer. In addition, the effect of desulfurization was good, and neither frothing of the amine solution nor malfunction of the compressor was observed. According to the practical parameters, the actual flow rate of lean amine solution in the desulfurizer was about 35 tons/h in contrast to the designed value of 55 tons/h; the average content of $H_2S$ in the circulating hydrogen after desulfurization was 1700 $ml/m^3$ (with a maximum of 5000 $ml/m^3$ and a minimum of 200 $ml/m^3$), indicating that $H_2S$ was also kept under good control even at a low flow rate of lean amine solution.

2. Standardization of the Operation of the Device
See Table 1-2 below.

TABLE 1

The Operation State of the Vortex Separator for Low-pressure Separator Gas During the Standardization

| Time | Processing Capacity $Nm^3/h$ | Operating Pressure MPa | Liquid Content at Inlet $mg/Nm^3$ | Liquid Content at Outlet $mg/Nm^3$ | Removal Rate % |
|---|---|---|---|---|---|
| March 25 10:00 | 3197 | 1.55 | 618 | 89 | 85.6 |
| March 26 10:00 | 3170 | 1.55 | 761 | 87 | 88.6 |
| March 27 10:00 | 3105 | 1.55 | 377 | 76 | 79.8 |
| March 31 10:00 | 3438 | 1.55 | 792 | 123 | 84.5 |
| April 1 10:00 | 4103 | 1.55 | 934 | 92 | 90.1 |

It can be seen from the above data that the average liquid-removal rate of the vortex separator for the low-pressure separator gas is 85.7%, and the liquid content at outlet is substantially less than 100 $mg/Nm^3$.

TABLE 2

The Operation State of the Separator for Separating Amine Solution from LPG During the Standardization

| Time | Processing Capacity tons/h | Operating Pressure MPa | Liquid Content at Inlet mg/L | Liquid Content at Outlet mg/L | Removal Rate % |
|---|---|---|---|---|---|
| March 25 10:00 | 3.76 | 1.40 | 214 | 38 | 82.2 |
| March 26 10:00 | 4.82 | 1.41 | 105 | 31 | 70.5 |
| March 27 10:00 | 4.26 | 1.40 | 159 | 89 | 44.0 |
| March 31 10:00 | 6.11 | 1.40 | 262 | 44 | 83.2 |
| April 1 10:00 | 5.42 | 1.40 | 323 | 48 | 85.1 |

It can be seen from the above data that the average liquid-removal rate of the separator for separating amine solution from LPG is 73.0%, and the liquid content at outlet is less than 100 ppm.

3. Operational Effect:

(a) Consumption of Amine Solution

After a period of operation, the desulfurizing system in the new device was examined and compared with its counterpart in an old device (a hydrocracking device of 1 million tons/year, wherein a sedimentation tank for separating liquid was disposed in front of the circulating hydrogen desulfurizer and the remaining components were the same as those of the new device). A yearly consumption of fresh amine solution was 30 tons for the new device and 55 tons for the old one. If the old device were converted into a device of 1.5 million tons/year, its consumption of fresh amine solution would be 83 tons/year, which meant a decrease of 64% for the new device.

(b) Effect of Reducing Discharge

For the old device, a rather large amount of liquid was deposited in the buffer tank behind the desulfurizer. Since the liquid level increased from 0 to 20% every 2-3 days on an average, the liquid had to be discharged every 2 days averagely. When the concentration of the amine solution discharged was assumed to be 25%, it could be calculated that the yearly loss of fresh amine solution was about 16 tons. Such additional consumption didn't exist for the new device. Owing to the good effect of the vortex de-hydrocarbon unit within the new device in separating the liquid entrapped in the circulating hydrogen, the frothing phenomenon of amine solution initiated by the high-pressure separator oil entrapped in the circulating hydrogen was avoided, the desulfurization efficiency was increased, and the loss of amine solution was reduced.

(c) Long Cycle Run of the Device

In addition to the decreased consumption of amine solution, the desulfurizing system for circulating hydrogen had been in stable and safe operation without any fluctuation since it was started. The desulfurizing system for circulating hydrogen had to not only ensure the removal of $H_2S$ therein, but also keep the compressor for circulating hydrogen in safe and stable operation which was a sticking point for the device to run stably in a long cycle. Otherwise, the liquid drops entrapped in the gas would inflict liquid strike on the compressor, in which case the compressor would surge or even be damaged, and thus the device would have to stop working as an accident. Since the application of a vortex de-hydrocarbon unit for circulating hydrogen, the problem of entrapping liquid in circulating hydrogen had been totally solved from its very source, and the mode of "treatment after pollution" had been changed. The economic advantage of the device also favored its safe and stable operation in a long cycle.

(d) Effect of Energy Saving

According to the results of the standardization, the initial density of the circulating hydrogen was 181.4 g/m³ when it entered the compressor. After it was separated by the vortex de-hydrocarbon unit, its density was reduced by 32.3 g/m³, i.e. 15.1% lower than the initial value, wherein the content of C5 was 27.4 g/m³ lower, and that of $H_2O$ was 4.9 g/m³ lower. By assuming that the idling energy consumption was ⅓ that of the total energy consumption, the total energy consumption would be saved by 10.1%.

(e) Enhancement of Hydrogen Purity

Thanks to the vortex de-hydrocarbon unit for circulating hydrogen that was used to separate liquid, the volume content of C5 in the circulating hydrogen was reduced from 1.00% to 0.33%, i.e. 0.67% lower, and that of $H_2O$ was reduced from 0.815% to 0.20%, i.e. 0.61% lower, wherein the total reduction percentage was 1.28%. In other words, the concentration of the circulating hydrogen was enhanced. In the present case where the concentration of hydrogen was 85.75% when it entered the compressor, while that was 84.65% before it went to reduce the reactant liquid, the concentration was raised by 1.1%. This helped to prolong the useful life of the catalyst in the hydrogenation reactor and ensure its long-cycle operation of the device.

Since it is put into use in the desulfurizing system within the hydrocracking device of 1.5 million tons/year in Zhenhai Oil Refining & Chemical Engineering Company affiliated to SINOPEC, the vortex de-hydrocarbon unit for circulating hydrogen, which is stable in operation, convenient in manipulation and easy to control, has satisfied the demand of both industrial production and environmental compatibility. The highly-efficiency vortex separating technology for circulating hydrogen exhibits prominent benefit in terms of both economy and resources, for it has solved the frothing problem of amine solution due to the entrapment of high-pressure separator oil, reduced the loss of amine solution and ensured the long-cycle safe run of the compressor.

All references mentioned in this disclosure are incorporated herein by reference, as if each of them would be incorporated herein by reference independently. In addition, it is to be appreciated that various changes or modifications can be made to the invention by those skilled in the art who have read the content taught above. These equivalents are intended to be included in the scope defined by the following claims of the application.

What is claimed:

1. A short-flow system for desulfurization of circulating hydrogen, comprising:
    a heating burner that is configured for heating a raw oil;
    a hydrogenation reactor that is connected to the heating burner;
    a heat exchanger that is connected to the hydrogenation reactor;
    an air cooler that is connected to the heat changer;
    a high-pressure separator device that is directly connected to the air cooler and is configured to separate a circulating hydrogen mixture containing hydrogen sulfide and heavy hydrocarbons from a formed oil;
    a de-hydrocarbon device that is directly connected to an outlet of the high-pressure separator device and configured to remove condensed heavy hydrocarbons from the circulating hydrogen mixture received from the high-pressure separator device by separating liquid drops of the condensed heavy hydrocarbons in a dispersion phase from the circulating hydrogen in a continuous phase, and obtaining a condensed heavy hydrocarbon phase and a mixture phase of circulating hydrogen containing sulfur, the air cooler is upstream of the high-pressure separator and the de-hydrocarbon device is provided downstream of the high-pressure separator;
    a desulfurizer device that is connected to a gas phase outlet of the de-hydrocarbon device, the desulfurizer device being configured to separate the obtained mixture phase to remove sulfides therein, so that circulating hydrogen without sulfur is obtained;
    a de-amine unit that is disposed within the desulfurizer device, the de-amine unit being configured to separate the obtained circulating hydrogen without sulfur to remove the amine solution therein, so that purified circulating hydrogen is obtained; and
    a vortex separator unit that is disposed within a top part of the desulfurizer,
    wherein the high-pressure separator device is separate from the de-hydrocarbon device.

2. A system of claim 1, wherein the de-amine unit is selected from a sedimentation tank, a coalescer and a hydrocyclone.

3. A system of claim 2, wherein for the de-amine unit used to recover amine solution, the de-amine unit has a cut particle size up to 5 μm, recovery is more than 90% for liquid drops lager than 10 μm, and isolating time is 1-3 seconds.

4. A system of claim 1, wherein for the de-amine unit used to recover the amine solution, the de-amine unit has a cut particle size of up to 5 μm, recovery is more than 90% for liquid drops larger than 10 μm, and isolating time is 1-3 seconds.

5. A system of claim 1, wherein when hydrocarbon components in the de-hydrocarbon device are C5 and higher hydrocarbons, a calculated separation precision for the liquid drops is 3 μm, and the removal rate for the liquid drops larger than 5 μm is over 95%; separation precision for the liquid drops of liquid hydrocarbons, diesel oil and waster water containing sulfur is 15 μm, and removal rate for the liquid drops larger than 25 μm is over 95%; and pressure drop of the de-hydrocarbon unit is less than 0.15 MPa.

6. A system of claim 1, wherein there is trace amount of the heavy hydrocarbons at an outlet of underflow port when content of the heavy hydrocarbons at an inlet of the de-hydrocarbon device is no more than 1350 mg/m$^3$.

7. A system of claim 1, further comprising a wire mesh demister, disposed in front of the de-amine unit, for removing preliminarily part of the liquid drops and solid particles from gas mixture which enters the vortex separator located within the top part of the desulfurizer device.

8. A system of claim 1, wherein a rich amine solution in the desulfurizer device is discharged from solution accumulation chamber at a bottom to an amine solution regeneration column for regeneration, and lean amine solution from a generation column is mixed into a makeup amine solution and then pumped into the desulfurizer for recycling which reduces consumption of amine by 60%.

* * * * *